US012486148B2

(12) United States Patent
Oe et al.

(10) Patent No.: US 12,486,148 B2
(45) Date of Patent: Dec. 2, 2025

(54) WINCH DRUM MONITORING DEVICE

(71) Applicant: Sumitomo Heavy Industries Construction Cranes Co., Ltd., Tokyo (JP)

(72) Inventors: Toshiki Oe, Obu (JP); Tatsuya Matsushita, Obu (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 294 days.

(21) Appl. No.: 18/192,602

(22) Filed: Mar. 29, 2023

(65) Prior Publication Data

US 2023/0312312 A1 Oct. 5, 2023

(30) Foreign Application Priority Data

Mar. 30, 2022 (JP) ................................ 2022-055524

(51) Int. Cl.
*B66D 1/00* (2006.01)
*B66D 1/40* (2006.01)
*G01S 17/88* (2006.01)

(52) U.S. Cl.
CPC ................ *B66D 1/40* (2013.01); *G01S 17/88* (2013.01)

(58) Field of Classification Search
CPC .... B66D 1/40; B66D 1/30; B66D 1/56; B66C 13/16; G01S 17/88
See application file for complete search history.

(56) References Cited

U.S. PATENT DOCUMENTS

| | | | | |
|---|---|---|---|---|
| 9,783,399 | B2 * | 10/2017 | Hausladen | B66D 1/30 |
| 2018/0141787 | A1 | 5/2018 | Rudy et al. | |
| 2018/0141788 | A1 | 5/2018 | Rudy et al. | |
| 2018/0141789 | A1 | 5/2018 | Rudy et al. | |
| 2018/0143011 | A1 | 5/2018 | Rudy et al. | |
| 2022/0306434 | A1 * | 9/2022 | Ishida | B66C 13/48 |
| 2024/0166479 | A1 * | 5/2024 | Largy | B66C 23/88 |

FOREIGN PATENT DOCUMENTS

| | | | | | |
|---|---|---|---|---|---|
| CN | 104528569 | A | * | 4/2015 | B66D 1/36 |
| CN | 107403443 | A | * | 11/2017 | B66D 1/36 |
| EP | 3323765 | A1 | * | 5/2018 | B66C 13/16 |
| EP | 3915930 | A1 | * | 12/2021 | B66D 1/54 |
| FR | 3142182 | A1 | * | 5/2024 | B66C 13/16 |
| JP | 2018-138489 | | | 9/2018 | |
| WO | WO-2009027580 | A1 | * | 3/2009 | B66C 13/23 |
| WO | WO-2019222243 | A1 | * | 11/2019 | B66D 1/36 |

* cited by examiner

*Primary Examiner* — Emmanuel M Marcelo
(74) *Attorney, Agent, or Firm* — WTA IP Law P.C.

(57) ABSTRACT

A winch drum monitoring device that monitors a state of a winch drum includes: a phase detector configured to detect a phase of the winch drum; and a distance detector configured to detect a distance to the winch drum or a distance to a wire rope wound around the winch drum.

16 Claims, 8 Drawing Sheets

WINCH DRUM MONITORING DEVICE

CROSS-REFERENCE TO RELATED APPLICATIONS

This application claims priority to Japanese Patent Application No. 2022-055524, filed on Mar. 30, 2022, which is incorporated by reference herein in its entirety.

BACKGROUND

Technical Field

A certain embodiment of the present invention relates to a winch drum monitoring device.

Description of Related Art

In a work machine such as a crane which winds and unwinds a wire using a winch drum, in the related art, it has been proposed to detect a state of the winch drum using a laser scanning type distance measurement device such as light detection and ranging (LiDAR) (for example, refer to the related art).

SUMMARY

According to an embodiment of the present invention, there is provided a winch drum monitoring device that monitors a state of a winch drum, the device including: a phase detector configured to detect a phase of the winch drum; and a distance detector configured to detect a distance to the winch drum or a distance to a wire rope wound around the winch drum.

DETAILED DESCRIPTION

However, in the related art, the application of the laser scanning type distance measurement device such as LiDAR has only been proposed, and it has been difficult to specifically detect a winding layer and a winding row with high accuracy.

It is desirable to detect a winding layer and a winding row of a winch drum with higher accuracy.

According to an embodiment of the present invention, it is possible to detect a winding layer and a winding row of the winch drum with higher accuracy.

Outline of Crane

Figure 1:
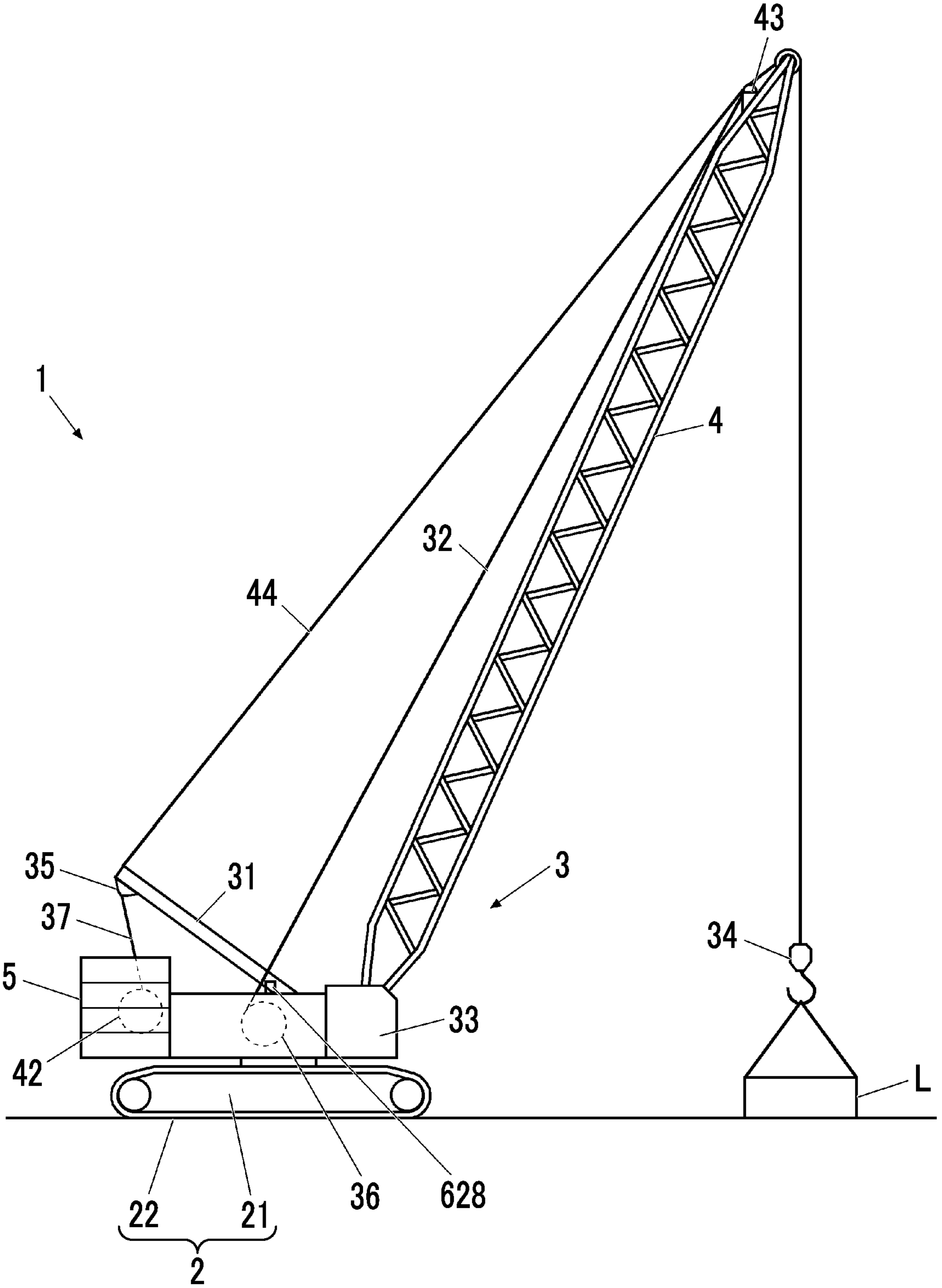
FIG. 1 is a side view of a crane in which a winch drum monitoring device according to an embodiment of the present invention is mounted.

FIG. 1 is a side view of a crane as a work machine in which a winch drum monitoring device according to one embodiment of the present invention is mounted.

A crane 1 is a so-called mobile crawler crane. Regarding the description of the crane 1, a forward direction of a vehicle is referred to as "front", a backward direction is referred to as "rear, and a left-hand side and a right-hand side in a state where the vehicle faces forward are referred to as "left" (back side of the drawing sheet of FIG. 1) and "right" (front side of the drawing sheet of FIG. 1), respectively. In addition, a lower traveling body 2 that travels and a rotating platform 3 that turns on the lower traveling body 2 are provided; however, unless otherwise specified, in principle, the directions of each part will be described on the assumption that the lower traveling body 2 and the rotating platform 3 are aligned with each other in a front-back direction (referred to as a reference posture).

As shown in FIG. 1, the crane 1 includes the lower traveling body 2 of a crawler type that can travel automatically; the rotating platform 3 that is turnably mounted on the lower traveling body 2; and a boom 4 that is derrickably attached to a front side of the rotating platform 3.

The lower traveling body 2 includes a main body 21 and crawlers 22 provided on both left and right sides of the main body 21. The left and right crawlers 22 are each rotationally driven by traveling hydraulic motors (not shown).

The boom 4 is derrickably attached to the front side of the rotating platform 3. A sheave 43 that guides a hoisting rope 32 as a wire rope is rotatably attached in the vicinity of an upper tip of the boom 4.

In addition, a lower end portion of a mast 31 is supported on a rear side of the boom 4 on the rotating platform 3.

In addition, the rotating platform 3 is driven and turned around an axis along a vertical up-down direction with respect to the lower traveling body 2 by a turning hydraulic motor (not shown).

A cab 33 is disposed on a right front side of the rotating platform 3.

In addition, a counterweight 5 that balances the weights of the boom 4 and a suspended load L is attached to a rear portion of the rotating platform 3. The number of the counterweights 5 can be increased or reduced as necessary.

A derricking winch 42 that performs a derricking operation of the boom 4 is disposed in the vicinity of the counterweight 5, and a hoisting winch 36 that winds and unwinds the hoisting rope 32 is disposed in front of the derricking winch 42. The hoisting winch 36 winds and unwinds the hoisting rope 32 using a hoisting hydraulic motor (not shown), and raises and lowers a hook 34 and the suspended load. A detailed configuration of a winch drum 361 used for the hoisting winch 36 will be described later.

The mast 31 includes an upper spreader 35 at an upper end portion, and the upper spreader 35 is connected to the other end portion of a pendant rope 44 of which one end portion is connected to an upper end portion of the boom 4. A lower spreader (not shown) is provided below the upper spreader 35, and when a derricking rope 37 that is a wire rope wrapped between the upper spreader 35 and the lower spreader multiple times is wound or unwound by the derricking winch 42, the distance between the upper spreader 35 and the lower spreader is changed and the boom 4 is derricked. The derricking winch 42 is driven by a derricking hydraulic motor (not shown).

Control System for Crane

Figure 2:
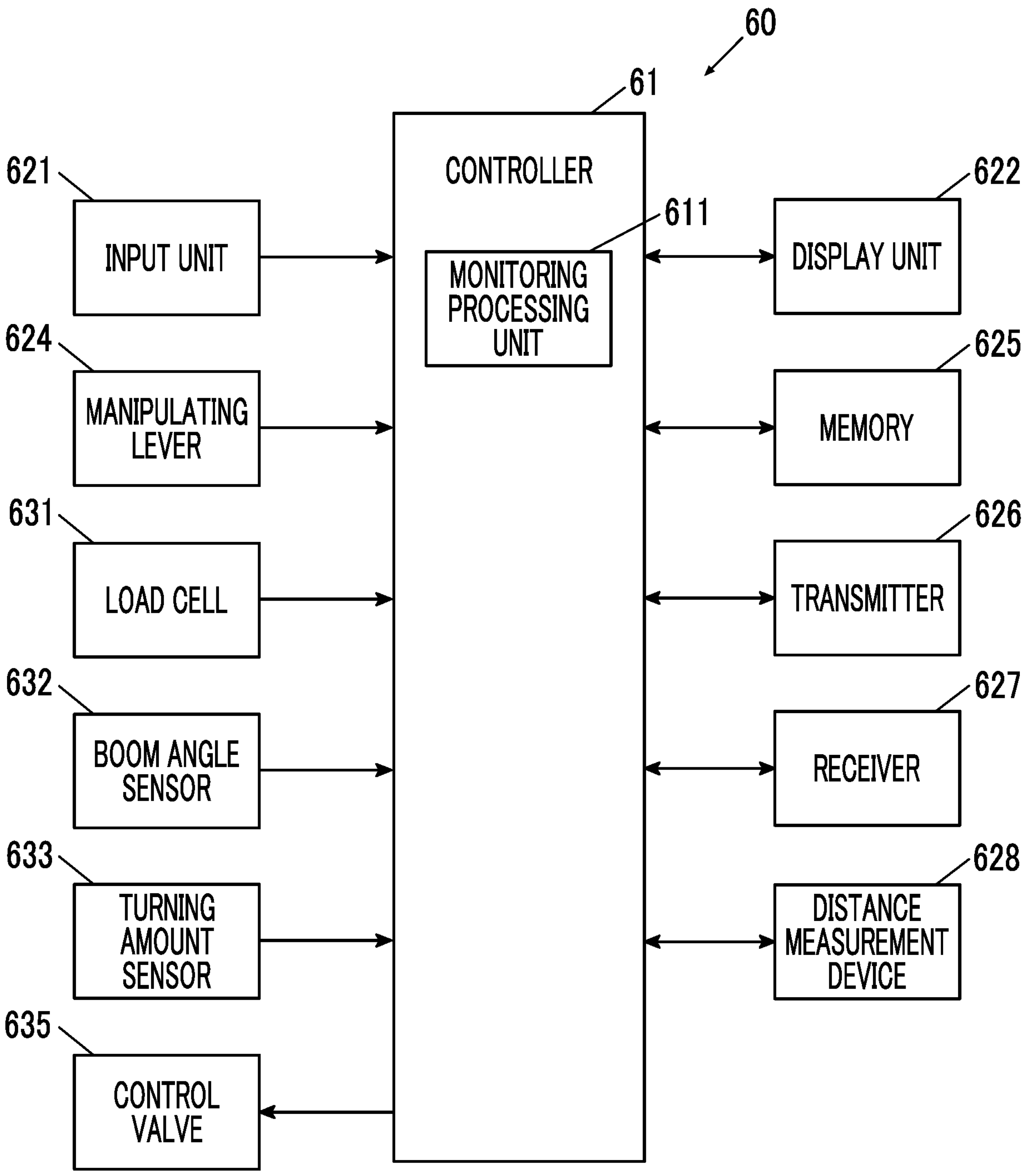
FIG. 2 is a block diagram showing a configuration of a control device for the crane and peripherals of the control device.

A control device 60 for the crane 1 is mounted in the cab 33 or the like of the rotating platform 3. FIG. 2 is a block diagram showing a configuration of the control device 60 and peripherals of the control device 60. The control device 60 is a control terminal mounted in the crane 1, and performs a monitoring process on winding and unwinding of the hoisting rope 32 by the hoisting winch 36, in addition to controlling various operations such as the traveling and turning of the crane 1 and the winding and unwinding of the hoisting rope 32.

The control device 60 includes a controller 61 including a calculation processing device including a CPU, a ROM and a RAM that are storage devices, other peripheral circuits, and the like.

The controller 61 includes a software module of a monitoring processing unit 611 that performs the monitoring process on winding and unwinding of the hoisting rope 32 to be described later. The monitoring processing unit 611 may be configured from hardware.

An input unit 621, a display unit 622, a manipulating lever 624, and a memory 625 are connected to the controller 61, and these components constitute the control device 60.

Further, a load cell 631, a boom angle sensor 632, a turning amount sensor 633, a control valve 635, and a distance measurement device 628 are connected to the controller 61.

The monitoring processing unit 611, the distance measurement device 628, and the display unit 622 constitute a winch drum monitoring device that monitors a state of the winch drum 361 of the hoisting winch 36.

Details of the function of the monitoring processing unit 611 will be described later.

The input unit 621 is provided in the cab 33, for example, is an input interface such as touch panel, and outputs a control signal, which corresponds to a manipulation from an operator, to the controller 61. The operator can manipulate the input unit 621 to input the length of the boom 4, the weight of the hook 34, other various settings, or various information required for operation.

The display unit 622 is provided in the cab 33, for example, includes a touch panel type display that is also used as the input unit 621, and displays information such as the weight of the suspended load, the boom angle, and the turning angle of the rotating platform 3 on a display screen based on a control signal output from the controller 61. In addition, the display unit 622 functions as a notifier configured to perform notification through display by the monitoring processing unit 611 to be described later.

The manipulating lever 624 is provided in the cab 33, for example, manually inputs manipulations to cause the crane 1 to perform various operations, and inputs a control signal, which corresponds to a manipulated variable of the manipulating lever 624, to the controller 61.

For example, the manipulating lever 624 can input manipulations for the traveling operation of the lower traveling body 2, the turning operation of the rotating platform 3, the derricking operation of the boom 4, and the winding and unwinding of the hoisting rope 32 by the hoisting winch 36.

The load cell 631 is attached to a terminal of the derricking rope 37 wrapped around the upper spreader 35 and the lower spreader multiple times, and detects a tension acting on the derricking rope 37 when the boom 4 is derricked, and outputs a control signal, which corresponds to the detected tension, to the controller 61.

The load cell 631 may be disposed anywhere as long as the load cell 631 can indirectly measure a derricking force of the boom 4. For example, the load cell 631 may be provided at the attachment position (not shown) of the pendant rope 44 at the tip of the boom 4, and may detect a tension applied to the pendant rope 44.

The boom angle sensor 632 is attached to a base end side of the boom 4, and detects a derricking angle of the boom 4 (hereinafter, also referred to as a boom angle) and outputs a control signal, which corresponds to the detected boom angle, to the controller 61. For example, the boom angle sensor 632 detects a ground angle, which is an angle with respect to a horizontal plane, as the boom angle.

The turning amount sensor 633 is attached between the lower traveling body 2 and the rotating platform 3, and detects a turning angle of the rotating platform 3, and outputs a control signal, which corresponds to the detected turning angle, to the controller 61. The turning amount sensor 633 detects, for example, an angle around a vertical axis as the turning angle.

The control valve 635 includes a plurality of valves that can be switched according to control signals from the controller 61.

For example, the control valve 635 includes a valve that controls the rotational drive of the left and right crawlers 22 of the lower traveling body 2, a valve that controls the turning operation of the rotating platform 3, a valve that controls the rotational drive of the derricking winch 42, a valve that controls the rotational drive of the hoisting winch 36, and the like.

Distance Measurement Device

The distance measurement device 628 is a distance detector that detects a distance to the winch drum 361 of the hoisting winch 36 or the hoisting rope 32 wound around the winch drum 361, and detects a layer and row state of the hoisting rope 32 wound around the winch drum 361.

The layer and row state of the hoisting rope 32 indicates the number of layers of and the number of rows of the hoisting rope 32 that is stacked and wound around the winch drum 361 in a layered manner.

The hoisting rope 32 at the position where the hoisting rope 32 wound around the winch drum 361 starts to separate from the state of being wound around a winding body (winding portion) 362 is referred to as a "rope payout portion (reference sign 365 in FIG. 4A)". Therefore, the layer and row state of the hoisting rope 32 indicates a layer number and a row number where the rope payout portion 365 of the hoisting rope 32 is located.

In the present embodiment, a laser scanning type distance measurement device such as LiDAR will be provided as an example of the distance measurement device 628.

The distance measurement device 628 has a fan-shaped two-dimensional plane with a straight line of a predetermined length toward a front of the distance measurement device 628 as a radius and with a width within a predetermined angle range on both left and right sides of the straight line, as a detection plane (layer). The distance measurement device 628 can detect a distance from the distance measurement device 628 to an object, on which laser scanning is performed, within the range of the layer.

Figure 3:
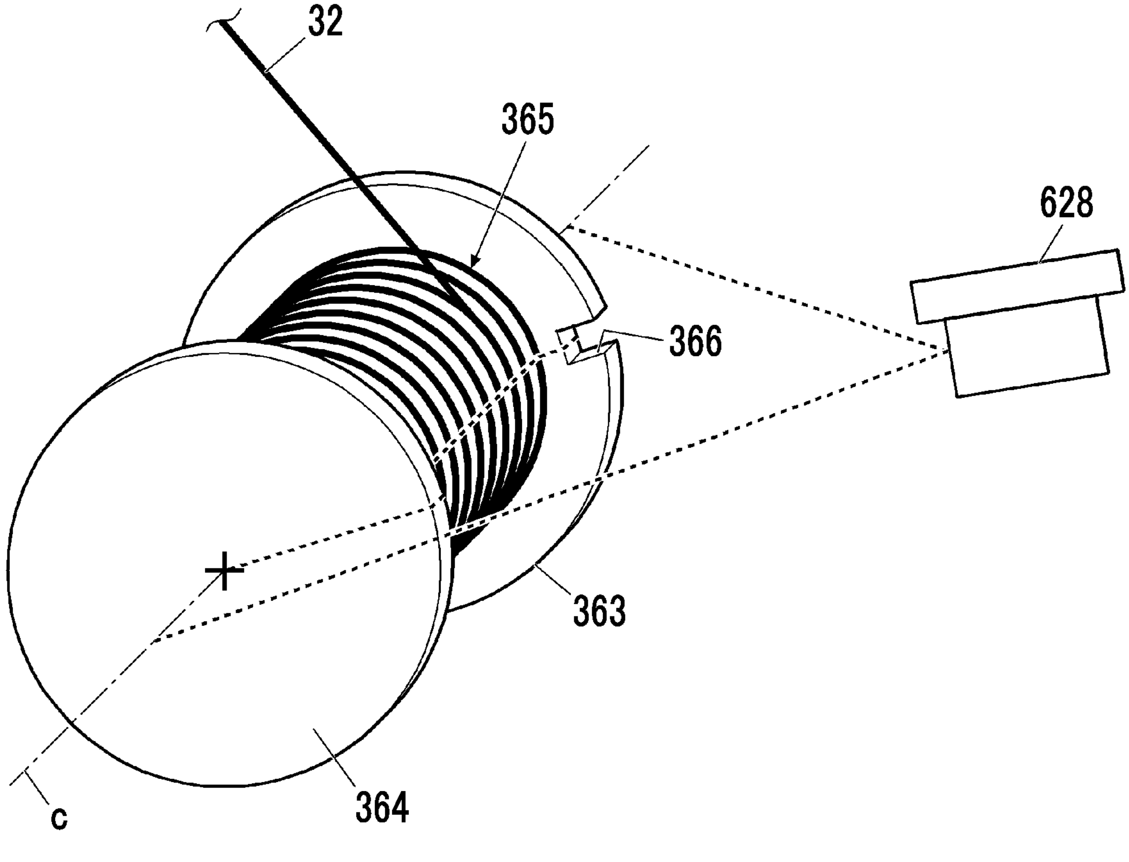
FIG. 3 is a perspective view showing a disposition of a distance measurement device and a winch drum.

FIG. 3 is a perspective view showing a disposition of the distance measurement device 628 and the winch drum 361. It is preferable that the distance measurement device 628 is installed in the crane 1 such that the front of the device faces a radial direction of the winch drum 361 and a center axis c of the winch drum 361 is located on the same plane as the layer of the distance measurement device 628.

It is not essential that the center axis c of the winch drum 361 is located within the plane of the layer of the distance measurement device 628. It is adequate if the distance measurement device 628 is disposed to face a direction in which an outer peripheral surface of the winding body 362 to be described later of the winch drum 361 is scanned over the entire axial length, and it is more preferable that the layer is located close to the center axis c of the winch drum 361.

It is adequate if the distance measurement device 628 can detect a distance to the hoisting rope 32 wound around the winch drum 361 over the entire range in an axial direction along the center axis c, and the distance measurement device 628 is not limited to the laser scanning type such as LiDAR, and other distance sensors can also be used.

Winch Drum

Figure 4A:
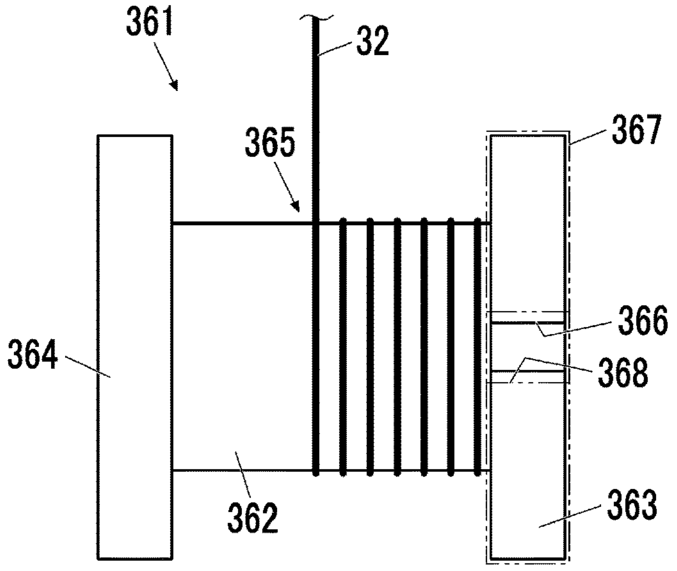
FIG. 4A is a front view of the winch drum as viewed in a radial direction.
Figure 4B:
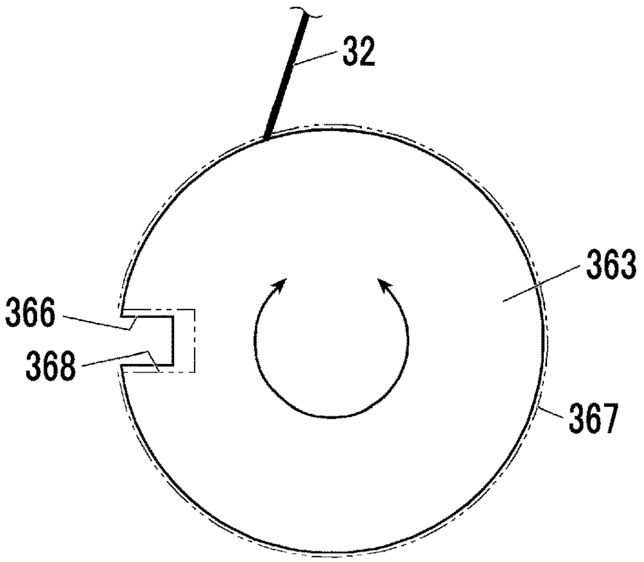
FIG. 4B is a side view as viewed in a center axis direction.
Figure 4C:
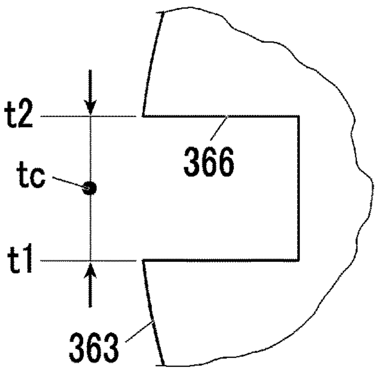
FIG. 4C is a partial enlarged view.

FIG. 4A is a front view of the winch drum 361 as viewed in the radial direction, FIG. 4B is a side view as viewed in a center axis direction, and FIG. 4C is a partial enlarged view.

As shown in FIG. 4A, the winch drum 361 includes the winding body 362 around which the hoisting rope 32 is wound, and two flange portions 363 and 364 having a brim shape and provided on both end portions of the winding body 362, and is supported so as to be rotatable around the center axis. Furthermore, the hoisting rope 32 can be wound around the winding body 362 of the winch drum 361 from one flange portion 363 side to the other flange portion 364 side in sequence, and the winding is repeated such that the hoisting rope 32 is stacked to form layers. Namely, the number of layers in the radial direction of the hoisting rope 32 is "number of layers" in the "layer and row state". In addition, the number of turns of the hoisting rope 32 on an outermost side wound from an end to the rope payout portion 365 is "the number of rows" in the "layer and row state".

The rope payout portion 365 refers to a portion of the hoisting rope 32 in an outermost layer, which is pulled away from the winding body 362.

When the hoisting rope 32 is wound around the winch drum 361, in a case where the hoisting rope 32 is wound in one layer from the one flange portion 363 side to the other flange portion 364 side, in the next layer, the hoisting rope 32 is folded back and wound in one layer from the other flange portion 364 side to the one flange portion 363 side, and the windings are alternately repeated to wind several layers of the hoisting rope 32.

Therefore, in an odd-numbered layer of the hoisting rope 32, a first row is on the one flange portion 363 side (the flange portion 363 on the right side in the example of FIG. 4A), and in an even-numbered layer, a first row is on the other flange portion 364 side (the flange portion 364 on the left side in the example of FIG. 4A).

In addition, a phase determination portion 366 that allows the distance measurement device 628 to detect a specified phase is provided on an outer peripheral portion of one flange portion 363. In this case, the distance measurement device 628 also functions as a phase detector configured to detect the phase determination portion 366.

The outer peripheral portion of the flange portion 363 has a circular shape with a uniform outer diameter in a circumferential direction, except for the phase determination portion 366, and the phase determination portion 366 has a shape protruding or recessed with respect to other portions. Therefore, when the distance measurement device 628 detects a distance to an outer periphery of the flange portion 363 of the rotating winch drum 361, the distance measurement value varies when the phase determination portion 366 passes through the layer. By detecting the variation in the distance measurement value, it is possible to detect that the winch drum 361 is at the specified phase. Hereinafter, a case where the phase determination portion 366 has a shape recessed with respect to other portions will be shown.

The monitoring processing unit 611 to be described later acquires the layer and row state of the hoisting rope 32 based on the distance measurement value detected at the specified phase, which is indicated by the phase determination portion 366, by the distance measurement device 628.

In this case, it is preferable that the phase indicated by the phase determination portion 366 is provided to avoid the phase range of the rope payout portion 365 that is at the position where the hoisting rope 32 starts to separate from the winding body 362 or the hoisting rope 32 wound around the winding body 362. The phase of the rope payout portion 365 varies depending on the derricking angle of the boom 4. Since the derricking angle of the boom 4 can vary within a derricking angle range in a work posture for performing lifting work (for example, 30 to 80° for crane specifications and 60 to 90° for tower specifications), it is preferable that the phase indicated by the phase determination portion 366 avoids the phase range of the rope payout portion 365, which corresponds to an angle range in which the boom 4 can be derricked in the work posture for performing lifting work, and it is more preferable that the phase indicated by the phase determination portion 366 avoids a phase range for the entire derricking angle range (for example, 0 to 90°) from a derricking angle limit of the crane including a derricking angle range, which is used for a lowering motion in a parking posture or during disassembly and assembly, to the position where the boom becomes horizontal.

When the phase indicated by the phase determination portion 366 is disposed to be included within the range of the rope payout portion 365, the distance measurement device 628 also detects a distance to the rope payout portion 365 that is derricked and separated from the winding body 362 or the hoisting rope 32 wound around the winding body 362. The rope payout portion 365 moves or vibrates due to a payout operation, which is a concern, and the detection distance of the distance measurement device 628 varies, which is a concern.

Therefore, by providing the phase determination portion 366 so as to avoid the range of the rope payout portion 365, stable distance detection with little variation can be performed.

Here, as shown in FIG. 4C, since the phase determination portion 366 has a certain length in the circumferential direction, the detection of the phase determination portion 366 by the distance measurement device 628 extends over a certain period.

For example, when the distance measurement device 628 continuously perform detection in a very short sampling cycle, there is a possibility that a plurality of distance measurement values are obtained during a period in which the phase determination portion 366 is detected.

In that case, an average value of the plurality of distance measurement values may be treated as a distance measurement value in a predetermined phase. In addition, the layer and row state of the hoisting rope 32 may be obtained with a distance measurement value, which is detected at an intermediate timing tc between a detection start timing t1 and a detection end timing t2 of the phase determination portion 366 by the distance measurement device 628, regarded as the distance measurement value at the predetermined phase.

In addition, a cover 367 that covers the outer peripheral portion to avoid contact with the outside is mounted on the flange portion 363 of the winch drum 361. The cover 367 is fixedly mounted on a crane 1 side with respect to the rotating flange portion 363.

Furthermore, an opening portion 368 that exposes the phase determination portion 366 to the outside is formed in the cover 367 at the position where the layer of the distance measurement device 628 intersects therewith. The opening portion 368 is open over a range wider than the entire width of the flange portion 363 and longer than the circumferential length of the phase determination portion 366. Therefore, the detection of the phase determination portion 366 by the distance measurement device 628 is not interfered.

The other flange portion 364 is formed in a shape in which a certain shape is periodically repeated to perform braking of the winch drum 361 (for example, a substantially polygonal shape, a substantially gear shape, or the like).

If the phase determination portion 366 is provided in the flange portion 364, it is preferable that the depth should be set inside a range that can be taken by the outer diameter of the flange portion 364 (in the case of a protruding shape, the protrusion amount should be set outside the range that can be taken).

Monitoring Process

The monitoring process by the monitoring processing unit 611 of the controller 61 will be described.

The monitoring processing unit 611 performs the monitoring process of obtaining the number of layers and the number of rows of the hoisting rope 32 wound around the winch drum 361, based on a distance detection result for the winch drum 361 by the distance measurement device 628.

The distance measurement device 628 performs laser scanning on the inside of the layer including the center axis c of the winch drum 361 from the outside in a radial direction of rotation of the winch drum 361 toward the inside in the radial direction. Accordingly, a distance to an outer surface of the hoisting rope 32 wound around the winding body 362 is measured at positions apart by very small distances along the axial direction between the one flange portion 363 and the other flange portion 364.

Figure 5:
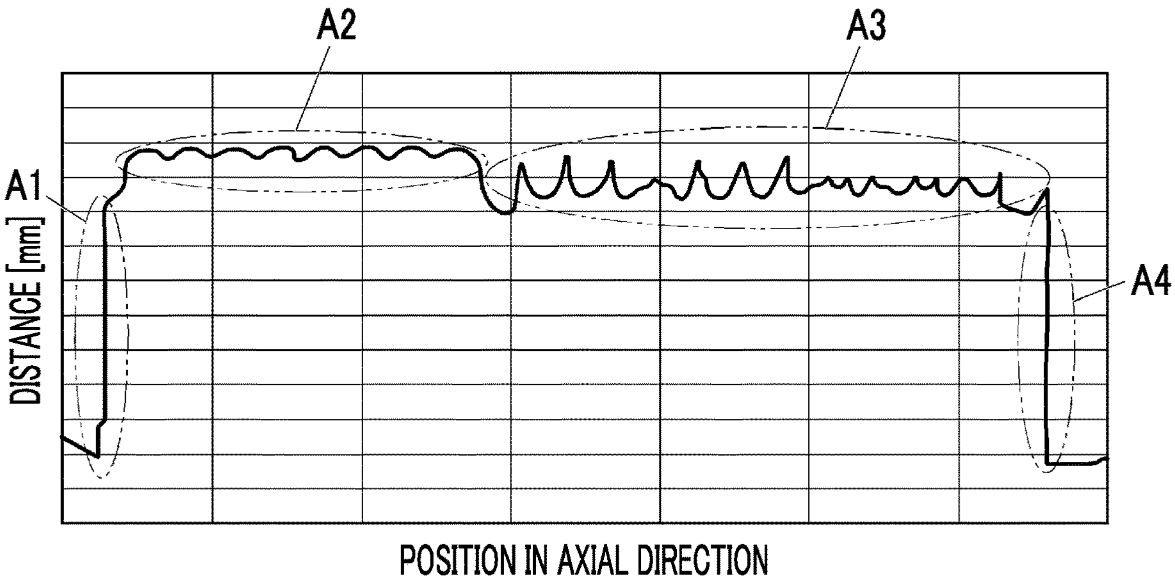
FIG. 5 is a line chart showing a distance detection result for the winch drum by the distance measurement device.

FIG. 5 is a line chart showing a distance detection result for the winch drum 361 by the distance measurement device 628.

In FIG. 5, the horizontal axis represents the position along the axial direction of the center axis c of the winch drum 361, and the vertical axis represents the detection distance to an outer periphery of the winch drum 361 at each position along the axial direction of the center axis c.

In the shown distance detection result, a section A1 indicates the flange portion 363, and a section A2 indicates the outer peripheral surface of the winding body 362 around which the hoisting rope 32 is not wound. Further, a section A3 indicates an outer periphery of the hoisting rope 32 wound around the winding body 362 in a layered manner, and a section A4 indicates the flange portion 364.

In order to obtain the number of layers and the number of rows of the hoisting rope 32, detection distances in the sections A2 and A3 between the flange portion 363 and the flange portion 364 are required.

On the other hand, since the flange portions 363 and 364 include inner surfaces of the flange portions 363 and 364 along a direction in which distance detection is performed, a rapid increase or a rapid reduction in detection distance appears in the sections A1 and A4.

Therefore, the monitoring processing unit 611 determines a threshold for the rate of change (inclination) in distance detection at each position in the axial direction with respect to distance detection information detected by one scanning, and detects the section A1 and the section A4. From here, the monitoring processing unit 611 can extract distance detection information of the sections A2 and A3 between the section A1 and the section A4, namely, between the flange portion 363 and the flange portion 364.

In addition, the phase determination portion 366 is provided in the flange portion 363. The phase determination portion 366 can be obtained from a distance detected at an end portion of the section A1 (lower end portion of the section A1 in FIG. 5).

As described above, in the section A1, since a rapid increase in detection distance occurs due to the flange portion 363, the phase determination portion 366 can be detected from a detection distance when the rapid increase occurs.

As described above, the phase determination portion 366 has a shape recessed toward a center side of the winch drum 361. For this reason, the value of the detection distance at a start position of the rapid increase in the detection distance in the section A1 detected by the distance measurement device 628 becomes larger in the phase determination portion 366 than in the outer peripheral portion of the flange portion 363.

Therefore, the monitoring processing unit 611 sets a threshold for a distance detected at the start position of the section A1, and when the distance is the threshold or more, it is determined that the phase is the predetermined phase indicated by the phase determination portion 366, and when the distance is less than the threshold, it is determined that the phase is other than the predetermined phase.

Further, when the monitoring processing unit 611 acquires the distance detection information between the flange portion 363 and the flange portion 364, the monitoring processing unit 611 normalizes the detection information of the sections A2 and A3. For example, the monitoring processing unit 611 calculates, through the normalization processing, a cumulative value by summing the detection distance at each position in the axial direction forming the distance detection information between the flange portion 363 and the flange portion 364. Alternatively, an average value of the detection distances at the positions in the axial direction may be obtained. Hereinafter, these calculated values are referred to as "normalized processing values".

Figure 6:
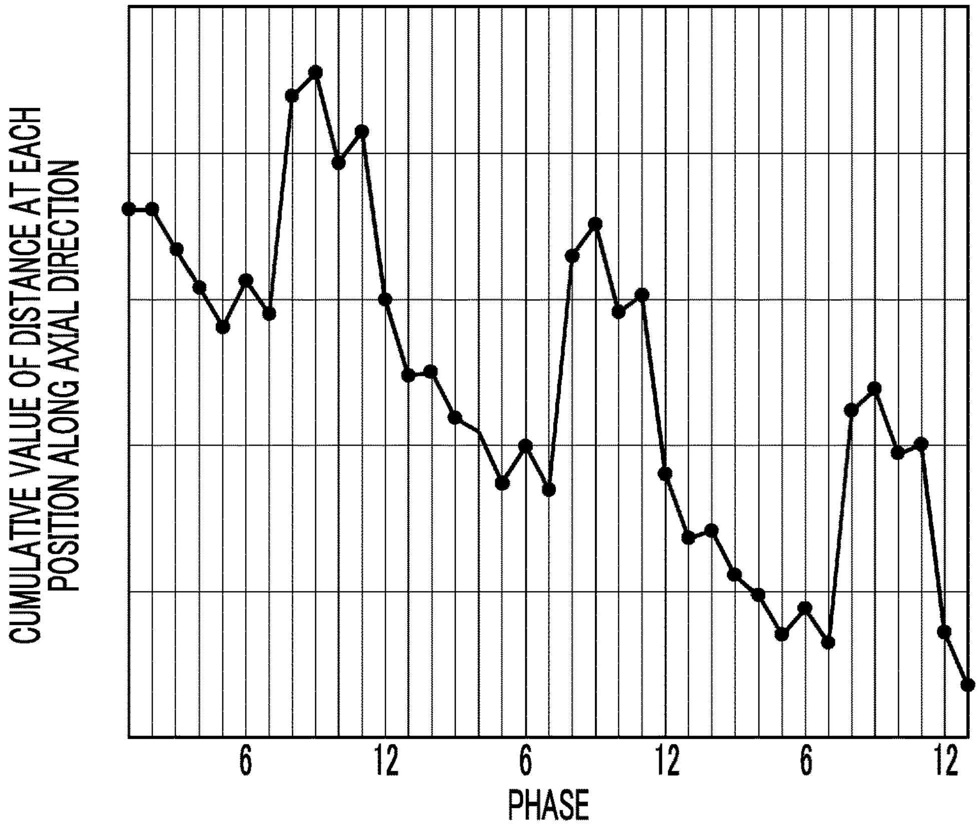
FIG. 6 is a line chart showing a normalized processing value for each phase of the winch drum.

FIG. 6 is a line chart showing a normalized processing value for each phase of the winch drum 361 (rotational angle). The horizontal axis of the line chart represents the phase of the winch drum 361, and the vertical axis represents the normalized processing value. The phase of the winch drum 361 has one-twelfth of one revolution as one unit. FIG. 6 shows a change in the normalized processing value of each phase when the winch drum 361 makes three revolutions.

Since the number of turns of the hoisting rope 32 increases by three rows while the winch drum 361 makes three revolutions, a gradual reduction in the normalized processing value caused by a gradual increase in the outer diameter of the winding body 362 is shown in the line chart of FIG. 6.

Figure 7:
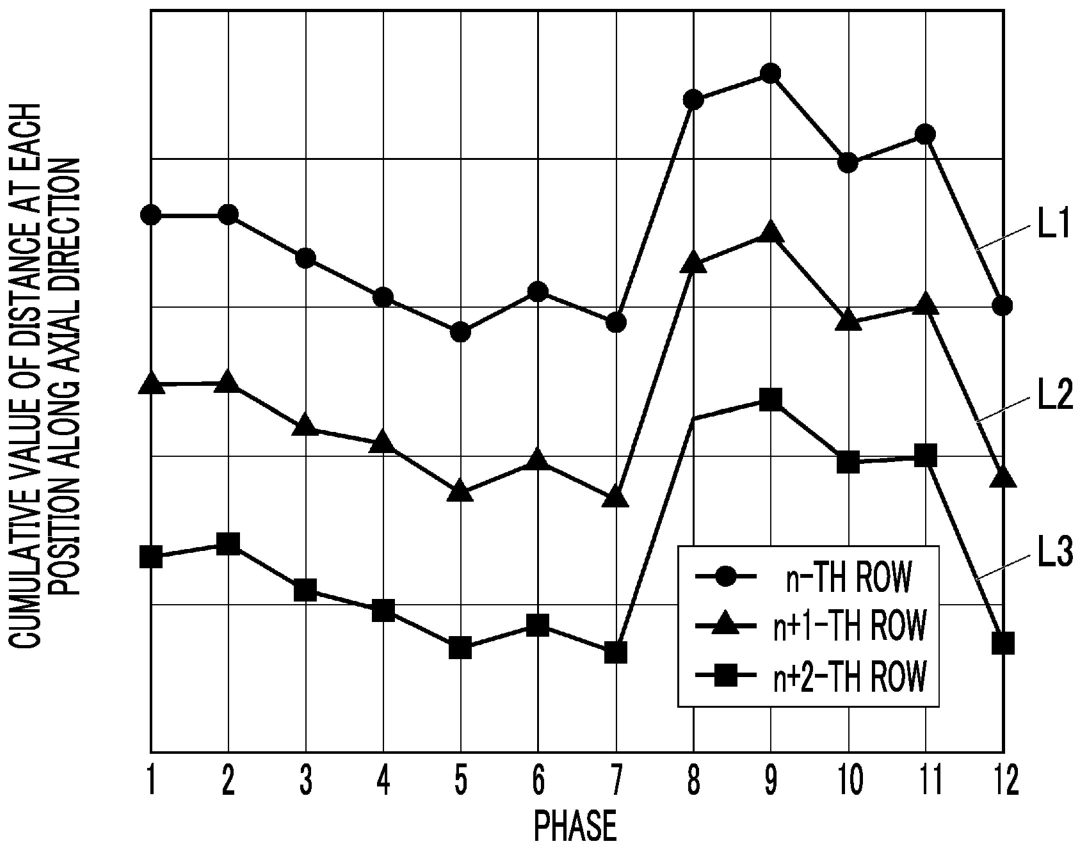
FIG. 7 is a line chart showing a normalized processing value detected for each phase of the winch drum during one revolution.

FIG. 7 is a line chart showing a normalized processing value detected for each of equally divided twelve phases during one revolution of the winch drum 361. FIG. 7 individually depicts a line chart L1 showing normalized processing values (● dots in the figure) for one revolution in which the hoisting rope 32 is wound in an n-th row, a line chart L2 showing normalized processing values (▲ dots in the figure) for one revolution in which the hoisting rope 32 is wound in an n+1-th row, and a line chart L3 showing normalized processing values (■ dots in the figure) for one revolution in which the hoisting rope 32 is wound in an n+2-th row. It is assumed that in the line charts L1 to L3, the number of layers of the hoisting rope 32 wound around the winch drum 361 are equal.

When the line charts L1 to L3 of FIG. 7 are compared, it is shown that the normalized processing values are individual numerical values depending on the number of rows of the hoisting rope 32 around the winch drum 361. In this case, it can be seen that the normalized processing values for equally divided twelve phases do not coincide for each number of rows. Further, it is apparent that when the number of layers of the hoisting rope 32 around the winch drum 361 is different, the normalized processing values are more significantly different. Namely, in order to specify the number of layers and the number of rows from the normalized processing values, it is necessary to specify the phase of the drum.

The monitoring processing unit 611 performs distance detection at the predetermined phase for each number of layers and each number of rows of the hoisting rope 32 around the winch drum 361 in advance using the distance measurement device 628, obtains eigenvalues of the normalized processing values for each number of layers and each number of rows, and stores the eigenvalues as reference values.

Then, during use of the hoisting winch 36, when the rotating winch drum 361 is at the predetermined phase, the monitoring processing unit 611 performs distance detection using the distance measurement device 628, and derives normalized processing values from detection data. Then, by comparing the derived normalized processing values with the reference values of the normalized processing values prepared for each number of layers and each number of rows, the process of specifying the current number of layers and number of rows of the hoisting rope 32 from a closest reference value is performed.

The monitoring processing unit 611 can recognize a specific phase of the winch drum 361 on which distance detection is to be performed, by detecting the phase determination portion 366 of the winch drum 361 described above.

Figure 8:
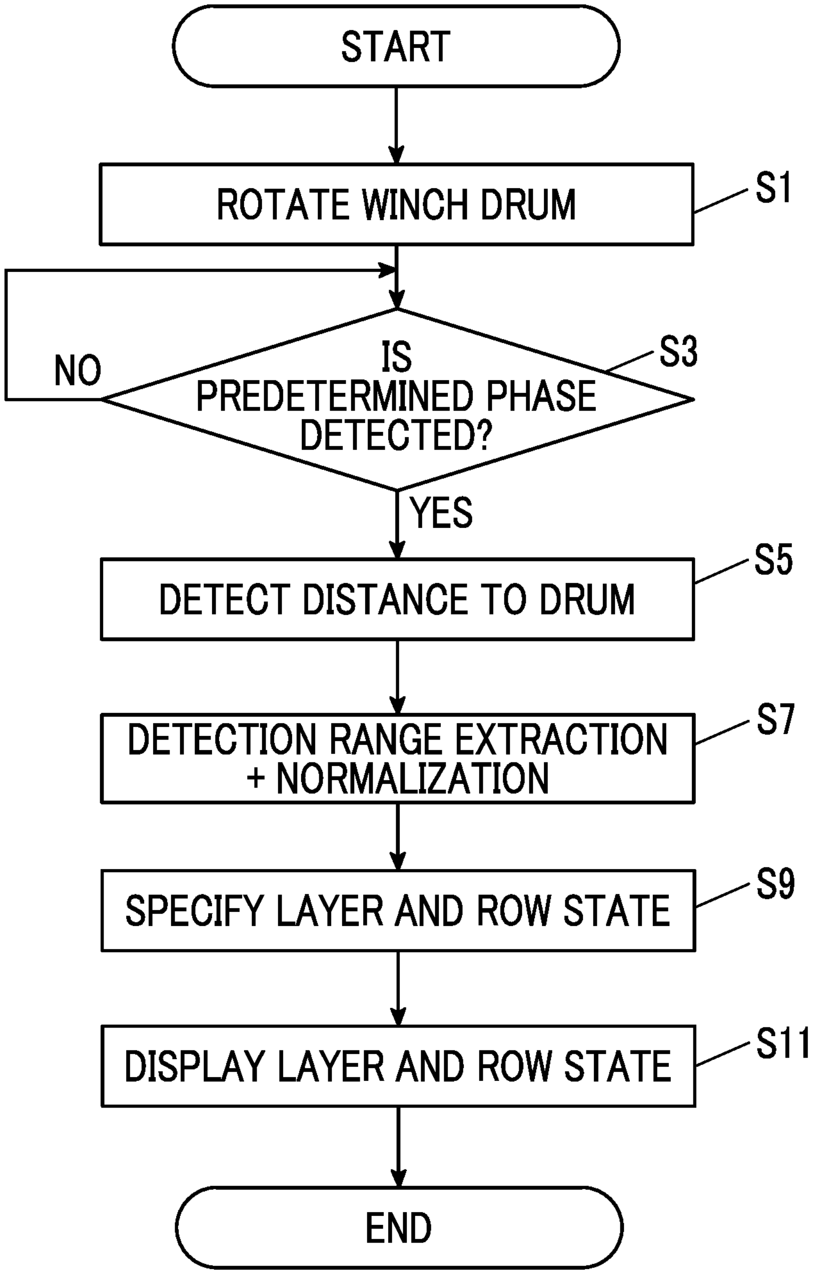
FIG. 8 is a flowchart of a monitoring process executed by a monitoring processing unit.

FIG. 8 is a flowchart of the monitoring process executed by the monitoring processing unit 611.

As shown, when the winch drum 361 rotates (step S1), the monitoring processing unit 611 performs laser scanning using the distance measurement device 628, and detects the phase determination portion 366 (step S3).

Then, when the phase determination portion 366 is detected, the distance measurement device 628 performs distance detection to acquire detection information for the winch drum 361 (step S5).

Next, the monitoring processing unit 611 extracts detection information of the sections A2 and A3 between the flange portion 363 and the flange portion 364 from the detection information at the predetermined phase, and derives normalized processing values by accumulating the distance at each position (step S7).

Further, the monitoring processing unit 611 compares the derived normalized processing values with the reference values of the normalized processing values indicating the number of layers and the number of rows of the hoisting rope 32 around the winch drum 361, and specifies the number of layers and the number of rows (layer and row state) of the hoisting rope 32 indicated by the derived normalized processing values (step S9).

Then, the monitoring processing unit 611 displays the specified layer and row information on the display unit 622 (step S11), and ends the monitoring process.

Figure 9:
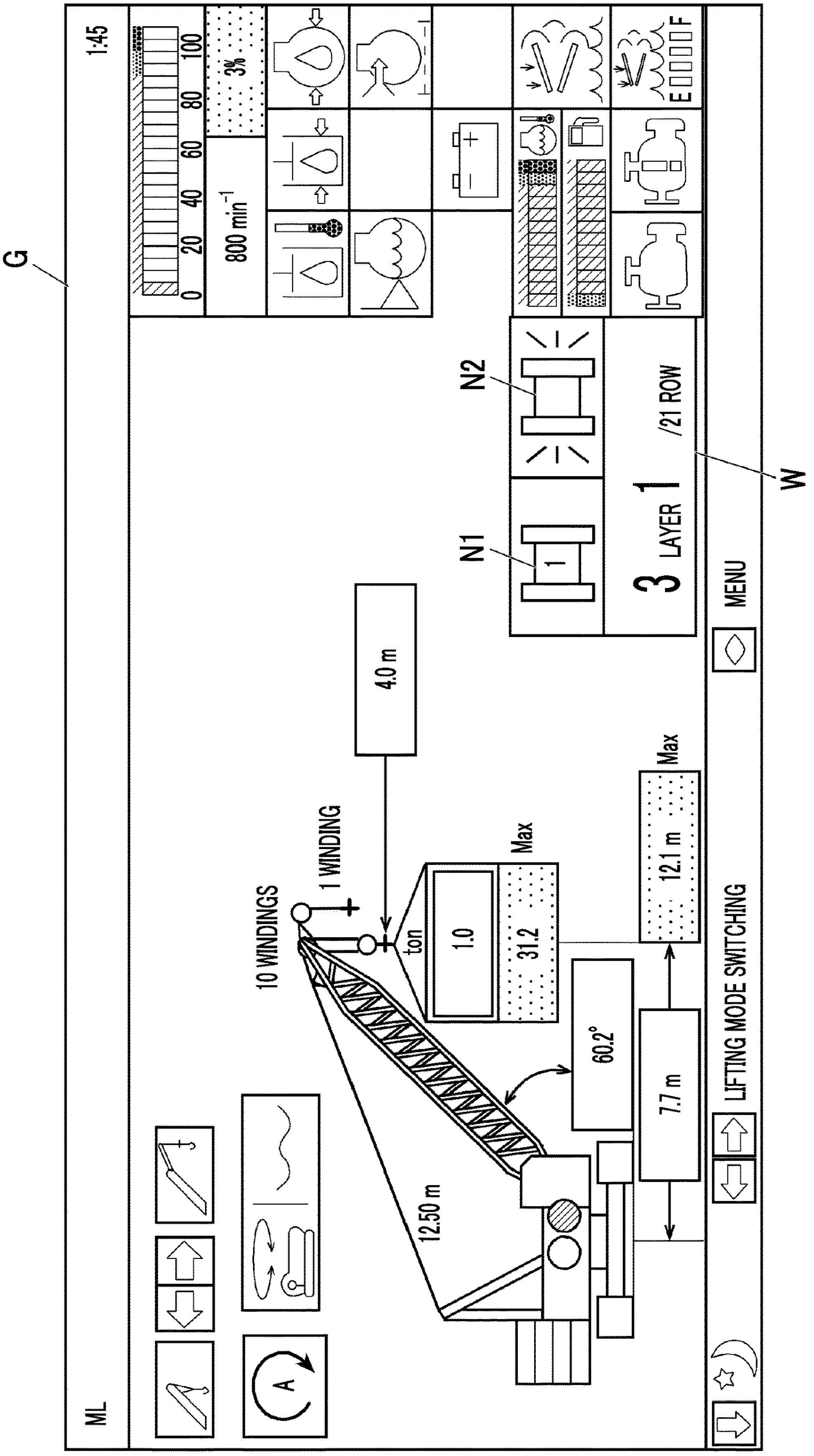
FIG. 9 is a view showing one example of a display screen in a display unit, which displays operating information such as various setting values or detection values in the crane.

FIG. 9 shows one example of a display screen G in the display unit 622, which displays operating information such as various setting values or detection values in the crane 1.

The monitoring processing unit 611 displays the specified layer and row information on the display screen G in the process of step S11.

A layer and row information display portion W that displays the layer and row information specified in the monitoring process is provided in a lower center portion of the display screen G. The layer and row information display portion W also displays the total number of rows wound in one layer adjacent to the number of rows based on the measurement.

The monitoring process is not limited to the case where the layer and row information of the hoisting rope 32 is displayed and the monitoring process is ended, and another state monitoring may be performed from the acquired layer and row information.

For example, when the hoisting rope 32 is paid out to the remaining first layer, strong friction is applied between the winding body 362 and the hoisting rope 32, so that operating the winch drum 361 so as to avoid such a case may be required.

Therefore, when the acquired layer and row information indicates that the hoisting rope 32 reaches the remaining first layer or that the hoisting rope 32 is close to the first layer (when there are several rows remaining to the first layer), a notification process may be performed through a method recognizable to the operator, such as display by the display unit 622, display by a notification lamp provided separately, or audio output by an audio output unit.

For example, in two frames on the layer and row information display portion W in the display screen G of FIG. 9, a first icon N1 indicating that an abrasion occurrence condition is satisfied when winding or unwinding is performed on the first layer, and a second icon N2 indicating that the abrasion occurrence condition is satisfied when a cumulative value of a winding length and an unwinding length in the first layer in which sliding contact between the hoisting rope 32 and the flange portions 363 and 364 occurs is more than a threshold are displayed, and the notification process by display is performed.

Technical Effects of Embodiments of the Invention

As described above, since the monitoring device includes the distance measurement device 628 that detects a phase of the winch drum 361 and a distance to the winch drum 361, layer and row information can be acquired with higher accuracy by using two detection information.

Particularly, since the monitoring device obtains the number of layers and the number of rows of the hoisting rope 32 wound around the winch drum 361 based on the detection by the distance measurement device 628, necessary information can be clearly acquired.

In addition, since the distance measurement device 628 detects a distance within a range including the entire axial length of the winding body 362, the number of layers and the number of rows of the hoisting rope 32 wound around the winch drum 361 can be more accurately obtained.

Further, since the obtained number of layers and number of rows of the hoisting rope 32 are displayed on the display unit 622, the information can be accurately shown to the operator and can be quickly recognized by the operator.

In addition, when the number of layers of the hoisting rope 32 wound around the winch drum 361 indicates the first layer based on detection by the distance measurement device 628, since the monitoring device notifies that an abrasion occurs between the winch drum 361 and the hoisting rope 32, the occurrence of the abrasion of the winch drum 361 by the hoisting rope 32 can be accurately recognized by the operator.

In addition, the winch drum 361 includes the flange portions 363 and 364 on both side portions of the winding body 362, and includes the phase determination portion 366 on an outer peripheral side in the radial direction of the one flange portion 363, the phase determination portion 366 protruding or being recessed with respect to others in the circumferential direction.

For this reason, it is adequate if the process of acquiring layer and row information by detecting a distance to the hoisting rope 32 is performed when the phase determination portion 366 provided partially in the circumferential direction is detected, it is not necessary to always detect a phase of the rotating winch drum 361 over the entirety in the circumferential direction, and the simplification of the process can be achieved.

In addition, the phase determination portion 366 can be detected by a sensor that performs distance detection.

Particularly, by causing the distance measurement device 628 to detect the phase determination portion 366, the need for a dedicated sensor for detecting the phase determination portion 366 can be eliminated.

Therefore, the simplification of the configuration of the monitoring device, the reduction in the number of components, and the reduction in manufacturing cost can be achieved.

In addition, by providing the phase determination portion 366 of the winch drum 361 so as to avoid the range of the rope payout portion 365, stable distance detection with less variation can be performed.

Others

The detailed parts shown in the embodiment of the invention can be changed as appropriate without departing from the concept of the invention.

For example, in the embodiment, the distance measurement device 628 of the monitoring device is configured to function as both a distance detector and a phase detector, but is not limited thereto.

For example, a configuration may be implemented in which the phase detector is provided separately from the distance measurement device 628. As the phase detector, any detector such as a potentiometer capable of detecting a phase (rotation amount) of the winch drum 361 or an encoder can be used.

In addition, the phase detected by the phase detector indicates the position in the circumferential direction of the winch drum 361, and is also obtained from the rotation amount of the winch drum 361; however, the present invention is not limited thereto. The phase detector may be any device as long as the position in the circumferential direction of the winch drum 361 can be known using the device.

In addition, the phase determination portion 366 is not limited to the structure causing a variation in distance at the predetermined phase, such as a protruding or recessed structure. For example, the phase determination portion 366 may be configured such that detection distances at different phases become different, such as having a shape in which the outer periphery of the flange portion of the winch drum 361 is gradually reduced over the entire circumference, and may be able to detect the predetermined phase by determining a detection distance corresponding to the predetermined phase.

In that case, the distance measurement device 628 of the monitoring device may be configured to function as a phase detector; however, a dedicated phase detector may be separately provided.

In addition, when the distance measurement device is not used as the phase detector, the phase determination portion 366 is not limited to the structure causing a variation in distance, such as a protruding or recessed structure. For example, a mark or the like is provided on a part in the circumferential direction of the flange portion of the winch drum 361, which corresponds to the predetermined phase, and the phase detector may be configured to detect the approach of the mark by reading the mark.

In addition, a plurality of the phase determination portions 366 that are each detected at different phases may be provided in the winch drum 361. In that case, for example, by changing the protrusion amount of a protruding structure for each phase and changing the depth of a recessed structure for each phase, the different phases can be distinguished.

In addition, when a plurality of phases are detected, it is preferable that comparison data of the normalized processing values indicating the number of layers and the number of rows of the hoisting rope 32 is prepared for each phase.

In such a manner, in the case of the configuration in which the plurality of different phases are detected, layer and row information of the winch drum 361 can be acquired with high frequency.

In addition, the distance measurement device 628 is configured to perform distance detection on one layer that is a two-dimensional plane, but is not limited thereto. For example, the distance measurement device 628 may use a configuration in which three-dimensional detection is performed using a plurality of layers with different heights and inclination angles.

In addition, in the embodiment, the monitoring device for the winch drum 361 of the hoisting winch 36 has been provided as an example; however, the winch drum of the derricking winch 42 may also be provided with a monitoring device having the same configuration.

In addition, in the embodiment, the example has been provided in which the monitoring device is provided in the winch drum of the crawler crane; however, the present invention is not limited to the crawler crane, and is applicable to any crane including a winch drum, such as harbor crane, overhead crane, jib crane, gantry crane, unloader, and fixed crane, in addition to other mobile cranes such as crane with tower attachment, wheel crane, and truck crane.

In addition, the present invention is not limited to the crane including a lifting hook, and a crane that suspends an attachment such as a magnet or an earth drill bucket is within the scope of application of the present invention.

It should be understood that the invention is not limited to the above-described embodiment, but may be modified into various forms on the basis of the spirit of the invention. Additionally, the modifications are included in the scope of the invention.

What is claimed is:

1. A winch drum monitoring device that monitors a state of a winch drum, the device comprising:

a phase detector configured to detect a phase of the winch drum;

a distance detector configured to detect a distance to the winch drum or a distance to a wire rope wound around the winch drum; and a phase determination portion for detecting a specified phase, wherein the phase detector detects the phase of the winch drum by detecting the phase determination portion.

2. The winch drum monitoring device according to claim 1, wherein a number of layers and a number of rows of the wire rope wound around the winch drum are obtained based on the detection by the distance detector.

3. The winch drum monitoring device according to claim 2, wherein the number of layers and the number of rows of the wire rope wound around the winch drum are the number of layers and the number of rows of a rope payout portion of the wire rope.

4. The winch drum monitoring device according to claim 1, further comprising:

a display unit that displays a number of layers and a number of rows of the wire rope wound around the winch drum, which are obtained based on the detection by the distance detector.

5. The winch drum monitoring device according to claim 2, wherein when the number of layers of the wire rope wound around the winch drum, which is obtained based on the detection by the distance detector, indicates a first layer, it is notified that an abrasion occurs between the winch drum and the wire rope.

6. The winch drum monitoring device according to claim 1, further comprising:

a monitoring processing unit, wherein a monitoring process is performed to obtain a number of layers and a number of rows of the wire rope wound around the winch drum, based on a distance detection result for the winch drum by the distance detector.

7. The winch drum monitoring device according to claim 6, wherein the monitoring processing unit obtains an eigenvalue of a normalized processing value for each of the number of layers and the number of rows of the wire rope wound around the winch drum, and stores the eigenvalue as a reference value.

8. The winch drum monitoring device according to claim 7, wherein when the winch drum is at a predetermined phase, the monitoring processing unit compares a normalized processing value derived from distance data detected by the distance detector, with the reference value, and performs a process of specifying a current number of layers and number of rows of the wire rope from the reference value closest to the normalized processing value.

9. The winch drum monitoring device according to claim 1, wherein the winch drum includes a winding portion around which the wire rope is wound, and flange portions provided on both side portions of the winding portion, and the distance detector detects the distance at least within a range including an entire axial length of the winding portion.

10. The winch drum monitoring device according to claim 1, wherein the winch drum includes a winding portion around which the wire rope is wound, and flange portions provided on both side portions of the winding portion, and the phase determination portion is provided at least partially in a circumferential direction on an outer peripheral side in a radial direction of the flange portion.

11. The winch drum monitoring device according to claim 10, wherein the phase determination portion has a substantially shape protruding or recessed with respect to other portions in the circumferential direction.

12. The winch drum monitoring device according to claim 10, wherein the phase detector also functions as the distance detector, and detects the phase of the winch drum by detecting a distance to the phase determination portion.

13. The winch drum monitoring device according to claim 1, wherein the winch drum includes a winding portion around which the wire rope is wound, and flange portions provided on both side portions of the winding portion, and the distance detector detects the distance while avoiding a rope payout portion on the winch drum, which is at a position where the wire rope starts to separate from the winding portion or the wire rope wound around the winding portion.

14. The winch drum monitoring device according to claim 1, wherein the phase detector is also configured to function as the distance detector.

15. A winch drum monitoring device that monitors a state of a winch drum, the device comprising:

a phase detector configured to detect a phase of the winch drum; and a distance detector configured to detect a distance to the winch drum or a distance to a wire rope wound around the winch drum, wherein the winch drum includes a winding portion around which the wire rope is wound, and flange portions provided on both side portions of the winding portion, a phase determination portion is provided at least partially in a circumferential direction on an outer peripheral side in a radial direction of the flange portion, and the phase detector detects the phase of the winch drum by detecting the phase determination portion.

16. A crane, comprising:

an upper rotating body;

a boom configured to be derrickable with respect to the upper rotating body;

a derricking winch configured to derrick the boom;

a hoisting winch configured to wind and unwind a hoisting rope; and a winch drum monitoring device configured to monitor a state of a winch drum of at least one of the derricking winch and the hoisting winch, wherein the winch drum monitoring device comprises:

a phase detector configured to detect a phase of the winch drum;

a distance detector configured to detect a distance to the winch drum or a distance to a wire rope wound around the winch drum; and a phase determination portion for detecting a specified phase, and the phase detector detects the phase of the winch drum by detecting the phase determination portion.

* * * * *